US008849287B2

(12) United States Patent
Masuda et al.

(10) Patent No.: US 8,849,287 B2
(45) Date of Patent: Sep. 30, 2014

(54) MOBILE COMMUNICATION METHOD, RADIO BASE STATION, RADIO NETWORK CONTROLLER, AND EXCHANGE STATION

(75) Inventors: Masafumi Masuda, Yokosuka (JP); Takeshi Okamoto, Yokosuka (JP); Hiroyuki Hosono, Yokohama (JP); Kenichiro Aoyagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 545 days.

(21) Appl. No.: 13/142,321

(22) PCT Filed: Dec. 25, 2009

(86) PCT No.: PCT/JP2009/071604
§ 371 (c)(1),
(2), (4) Date: Sep. 12, 2011

(87) PCT Pub. No.: WO2010/074236
PCT Pub. Date: Jul. 1, 2010

(65) Prior Publication Data
US 2011/0319087 A1    Dec. 29, 2011

(30) Foreign Application Priority Data
Dec. 26, 2008   (JP) .................................. 2008-335065

(51) Int. Cl.
*H04W 36/00* (2009.01)
*H04W 92/12* (2009.01)
*H04W 64/00* (2009.01)

(52) U.S. Cl.
CPC .............. *H04W 92/12* (2013.01); *H04W 64/00* (2013.01)
USPC ........................................................ 455/440

(58) Field of Classification Search
USPC ................... 455/440, 435.1, 456.1
See application file for complete search history.

(56) References Cited

U.S. PATENT DOCUMENTS

| 7,929,970 B1* | 4/2011 | Gunasekara et al. .......... 455/444 |
| 2004/0110503 A1* | 6/2004 | Park ........................... 455/435.1 |

FOREIGN PATENT DOCUMENTS

| JP | 2008-294568 A | 12/2008 |
| WO | 2008 047039 | 4/2008 |
| WO | 2008 051124 | 5/2008 |

OTHER PUBLICATIONS

3GPP TS 21.101 V10.0.0, "3rd Generation Partnership Project; Technical Specification Group Services and System Aspects; Technical Specification and Technical Reports for a UTRAN-based 3GPP system (Release 10)," 3GPP™, pp. 1-41, (Mar. 2011).
International Search Report issued Mar. 23, 2010 in PCT/JP09/071604 filed Dec. 25, 2009.
Japanese Office Action Issued Aug. 14, 2012 in Patent Application No. 2008-335065 (with English translation).
Chinese Office Action issued Jun. 5, 2013 in Patent Application No. 200980152813.X with English Translation.

* cited by examiner

*Primary Examiner* — Kwasi Karikari
(74) *Attorney, Agent, or Firm* — Oblon, Spivak, McClelland, Maier & Neustadt, L.L.P.

(57) ABSTRACT

A mobile communication method according to the present invention includes step A of notifying, by a radio base station NodeB01, a radio network controller RNC01 of location information of the radio base station NodeB (location code: bbb), step B of notifying, by the radio network controller RNC01, an exchange station MSC/SGSN of the location information of the radio base station NodeB (location code: bbb) when a mobile station UE starts communication via the radio base station NodeB and the radio network controller RNC01, and step C of controlling each session of the communication by the exchange station MSC/SGSN based on the location information of the radio base station NodeB (location code: bbb).

7 Claims, 8 Drawing Sheets

MOBILE COMMUNICATION METHOD, RADIO BASE STATION, RADIO NETWORK CONTROLLER, AND EXCHANGE STATION

TECHNICAL FIELD

The present invention relates to a mobile communication method, a radio base station, a radio network controller, and an exchange station.

BACKGROUND ART

In recent years, the 3GPP (3rd Generation Partnership Projects) has proposed and specified a mobile communication system employing a communication method called either a "W-CDMA (Wideband-Code Division Multiple Access) method or a "UMTS (Universal Mobile Telecommunications System) method" based on Code Division Multiple Access (CDMA) techniques.

FIG. 8 shows a configuration example of a mobile communication system of the W-CDMA mode. As shown in FIG. 8, the mobile communication system of the W-CDMA mode includes a mobile station UE (User Equipment), radio base stations NodeB, a radio network controller RNC, and an exchange station MSC/SGSN (Mobile Switching Center/Serving GPRS Support Node), thereby constituting the mobile communication system of a cellular method.

In the above-described mobile communication system of the W-CDMA method, an area called a "cell" that constitutes a control unit in the cellular method is formed by a radio wave delivered by the radio base station NodeB. This area is also called a "sector" when the area is formed into a sector by a directional antenna.

Here, it is usual that there are multiple radio network controllers RNCs and multiple exchange stations MSCs/SGSNs connected to one another because the exchange stations are arranged in a hierarchy. However, only one radio network controller RNC and one exchange station MSC/SGSN are shown in this description for simplification.

Moreover, it is usual to install a device called a home memory configured to store subscriber information, a server for offering application services, and the like in addition to the exchange station MSC/SGSN. However, description thereof will be omitted in this description similarly for simplification on the assumption that the function of the home memory and the function of the server are included in the exchange station MSC/SGSN.

Meanwhile, as for the type of the radio base station NodeB, it is considered to introduce a subminiature radio base station (hereinafter a femto radio base station) for mainly covering a small space such as an indoor space besides a radio base station having a relatively large capacity for widely covering an outdoor space.

Here, a cell formed by the outdoor radio base station is called a "macrocell" and a cell formed by the femto radio base station is called a "femtocell".

These femto radio base stations are each usually configured to include an IP interface for connection to the radio network controller RNC, and are technically capable of using a broadband network for home as a network for connection to the radio network controller RNC.

Moreover, the femto radio base station is generally small in size and low in price but has a structure supporting automatic adjustment of radio parameters corresponding to installation conditions. For this reason, it is possible to implement an operation mode allowing a general user to install the femto radio station readily and freely by connecting the femto radio station to an existing broadband network.

In the designing of the mobile communication system of the W-CDMA method, there may be a necessity to implement a function to perform control depending on a location of a mobile station UE in communication (that is, a communication-location dependent control function) as control specific to the mobile communication system.

For example, this is the control to connect the mobile station UE to an emergency agency closest to an area where the mobile station UE is in communication at the time of emergency notification, or to distribute restaurant information, weather information or the like near a location where the mobile station UE is present to the mobile station UE.

As a method of implementing the above-described communication-location dependent control function, there are methods of employing a "SAI (Service Area Identifier)" and a "Geographical Area Identifier (hereinafter GAI)" defined in the standard specification of the W-CDMA method.

The "SAI" is an information element in the 3GPP standard specification, which is formed as a combination of a "PLMN-ID (Public Land Mobile Network Identifier)", a "LAC (Location Area Code)", and a "SAC (Service Area Code)".

The "PLMN-ID" is an identifier for uniquely identifying a carrier which offers a mobile communication service. The "LAC" is an identifier for uniquely identifying a location registration area in the mobile communication system of the carrier. The "SAC" is an identifier for specifying a segmented area in the location registration area.

Although the configuration of the "SAC" can be determined as needed under the 3GPP standard specification, the "SAC" may include a unique radio network controller number within the "LAC", a unique radio base station number within the radio network controller, a unique cell number (or sector number, if formed into a sector by the directional antenna) within the radio base station, and the like.

In the meantime, although the "GAI" is also an information element in the 3GPP standard specification, the "GAT" is absolute geographic information independent of the configuration of the mobile communication system, that is, information containing latitude and longitude information.

In an example shown in FIG. 9, in a station configuration table retained by a radio network controller RNC01, "AA" is written as "PLMN-ID+LAC", "01" is written as "RNC number=01", "01" and "02" are written as "NodeB numbers" under the radio network controller RNC01 specified by "RNC number=01", and "01" and "02" are written as "sector numbers" under each of radio base stations NodeB01 and NodeB02 respectively specified by the "NodeB number=01" and "NodeB number=02".

The "SAT" for respective cells are "AA010101", "AA010102", "AA010201", and "AA010202" in order from the top.

Meanwhile, the latitude and longitude information on each of the cells is written as the "GAI".

In the meantime, the exchange station MSC/SGSN retains address information (such as a telephone number) of an emergency agency in association with the "SAI". For example, if there are an emergency agency 1 and an emergency agency 2 having the address information of "XXX1" and "YYY1", respectively, around the cell having the "SAT" of "AA010101", the exchange station MSC/SGSN stores the "SAT=AA010101" and the emergency agencies 1 and 2 in a destination table in association with each other.

The exchange station MSC/SGSN is notified of the "SAT" and the "GAT" by the radio network controller RNC by using "RANAP (Radio Access Network Application Part)" which is a signaling protocol in an application layer between the radio network controller RNC and the exchange station MSC/SGSN.

The exchange station MSC/SGSN retains the associations between the address information of the emergency agencies and the "SAI" in the destination table. Upon receiving a communication start request for emergency notification from the cell specified by the "SAI", the exchange station MSC/SGSN figures out the address information of the emergency agencies from the "SAI" notified by the radio network controller RNC in advance and transfers the communication start request to the address information of the emergency agencies.

Meanwhile, the above-described mobile communication system is able to offer a service of providing the mobile station UE with the longitude and latitude information included in the "GAI" and causing an application of the mobile station UE to display a screen of the nearest restaurant information or the weather information at the location specified by the "GAI", and to offer a service of providing the emergency agency with the longitude and latitude information included in the "GAI" so as to specify the location of the mobile station UE carrying out the emergency notification.

FIG. 10 shows operations of the conventional mobile communication system.

As shown in FIG. 10, in step S3001, the mobile station UE transmits a connection request for carrying out emergency notification communication addressed to the emergency agency 1 to the radio network controller RNC01.

In step S3002, the radio network controller RNC01 transmits a radio link establishment request to the radio base station NodeB01. In step S3003, the radio base station NodeB01 transmits a radio link establishment response to the radio network controller RNC01. In step S3004, a radio link establishment procedure is performed by the mobile station UE and the radio network controller RNC01.

In step S3005, the mobile station UE transmits a service request for carrying out the emergency notification communication addressed to the emergency agency 1 to the radio network controller RNC01 via the radio network established in step S3004.

In step S3006, with reference to the station configuration table, the radio network controller RNC01 extracts the "SAI" of the cell in which the mobile station UE is in communication, and transmits a service request including the "SAI" to the exchange station MSC/SGSN. The exchange station MSC/SGSN stores the "SAI".

After security and authentication procedures are performed by the mobile station UE and the exchange station MSC/SGSN in step S3007, the mobile station UE transmits a setup signal to the exchange station MSC/SGSN in step S3008. Here, the setup signal is for carrying out the emergency notification communication addressed to the emergency agency 1, more specifically, the setup signal includes "XXX" that means to carry out the emergency notification communication addressed to the emergency agency 1.

In step S3009, when the exchange station MSC/SGSN recognizes the "XXX" included in the received setup signal, the exchange station MSC/SGSN searches the destination table while using the "SAI" stored in step S3006 as key information to acquire the address information "XXX1" of the emergency agency 1, and transfers the setup signal to the address information "XXX1" of the emergency agency 1.

In step S3010, the communication (the emergency notification communication) between the mobile station UE and the emergency agency 1 is started after alerting and response procedures. Then, in step S3011, the emergency agency 1 transmits a location information request including the above-described "SAI" to the radio network controller RNC via the exchange station MSC/SGSN. In step S3012, the radio network controller RNC returns the "GAI", which is extracted by searching the station configuration table by using the "SAI" as key information, to the emergency agency 1 via the exchange station MSC/SGSN.

Here, the station configuration table and the destination table described above are statically retained in memories or disks as part of system data of the radio network controller RNC and the exchange station MSC/SGSN, respectively.

In a common practice for responding to changes in operating conditions, these system data are usually created as a file periodically, for example, once every week by a maintenance worker using a dedicated software tool, and inputted into the radio network controller RNC and the exchange station MSC/SGSN to be expanded into the memories and the disks.

Among the "PLMN-ID", the "LAC", as well as the radio network controller numbers, the radio base station numbers and the selector numbers in the "LAC" constituting the "SAI", the "PLMN-ID" is normally unchanged but the "LAC", the radio network controller numbers, the radio base station numbers, and the selector numbers may be changed during the operation due to a change in the location registration area, a new installation or connection change of the radio network controller RNC or the radio base station NodeB, and so forth.

In that case, it is necessary to change the station configuration table in the radio network controller RNC and the destination table in the exchange station MSC/SGSN synchronously in accordance with the above-described procedure.

SUMMARY OF THE INVENTION

Problems to be Solved by the Invention

Although numerous femto radio base stations are supposed to be newly installed due to their small capacities and are also required to be newly connected at flexible timing in order to correspond to the installation performed freely by a user, there is a problem of difficulty fulfilling the above because of complexity and huge workloads for updating the system data in the radio network controller RNC and the exchange station MSC/SGSN.

Meanwhile, the change in the location registration area and a new installation or connection change of the radio network controller RNC or the radio base station NodeB are executed on a routine basis by the carrier in the operations of the mobile communication system. In the conventional technique, it is necessary to synchronously update a table of associations between the address information of the emergency agencies and the "SAT" retained by the exchange station MSC/SGSN every time such a change occurs. Hence there are problems of complexity in operation and a major failure such as disconnection or improper connection of the emergency notification communication which may occur if a failure or an error in update is made due to an operation mistake.

Accordingly, the present invention has been made in view of the aforementioned problems. An objective of the present invention is to provide a mobile communication method, a radio base station, a radio network controller, and an exchange station, which are capable of newly managing numerous radio base stations such as femto base stations at flexible timing, avoiding operation complexity associated with a change in a location registration area and a new installation or connection change of a radio network controller or the radio base station, and avoiding a serious accident such as disconnection of emergency notification communication due to an operation mistake.

Means for Solving the Problems

The first feature of the present invention is summarized in that a mobile communication method including step A of notifying, by a radio base station, a radio network controller of location information of the radio base station, step B of notifying, by the radio network controller, an exchange station of the location information of the radio base station when a mobile station starts communication via the radio base station and the radio network controller, and step C of controlling each session of the communication by the exchange station based on the location information of the radio base station.

The second feature of the present invention is summarized in that a radio base station including an acquisition unit configured to acquire location information of the radio base station, and a notification unit configured to notify a radio network controller of the location information of the radio base station when a mobile station starts communication via the radio base station.

The third feature of the present invention is summarized in that a radio network controller configured to connect a radio base station, including an acquisition unit configured to acquire location information of the radio base station from the radio base station when a mobile station starts communication via the radio base station, and a notification unit configured to notify an exchange station of the location information of the radio base station when the mobile station starts communication via the radio base station and the radio network controller.

The fourth feature of the present invention is summarized in that an exchange station connected to a radio network controller configured to connect a radio base station, including a storage unit configured to store location information and a destination in association with each other, an acquisition unit configured to acquire location information of the radio base station from the radio network controller when a mobile station starts communication via the radio base station, the radio network controller and the exchange station, and a communication control unit configured to connect the mobile station to the destination associated with the location information of the radio base station in the communication.

Effect of the Invention

As described above, according to the present invention, it is possible to provide a mobile communication method, a radio base station, a radio network controller, and an exchange station, which are capable of newly managing numerous radio base stations such as femto base stations at flexible timing, avoiding operation complexity associated with a change in a location registration area and a new installation or connection change of a radio network controller or the radio base station, and avoiding a serious accident such as disconnection of emergency notification communication due to an operation mistake.

MODES FOR CARRYING OUT THE INVENTION (Configuration of Mobile Communication System According to First Embodiment of Present Invention)

A configuration of a mobile communication system according to a first embodiment of the present invention will be described with reference to FIG. 1 through FIG. 5.

Figure 1:
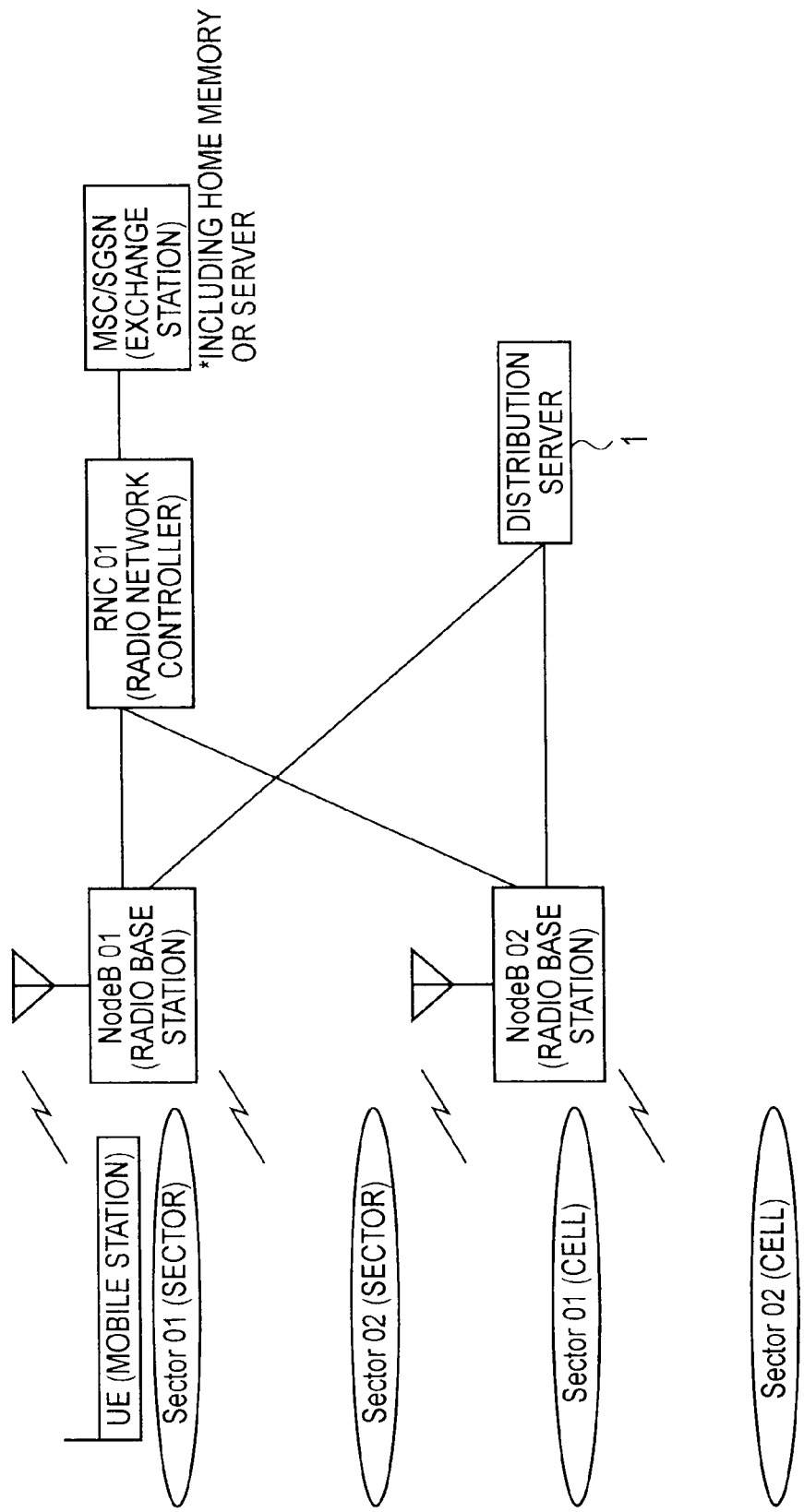
FIG. 1 is an overall configuration diagram of a mobile communication system according to a first embodiment of the present invention.
Figure 8:
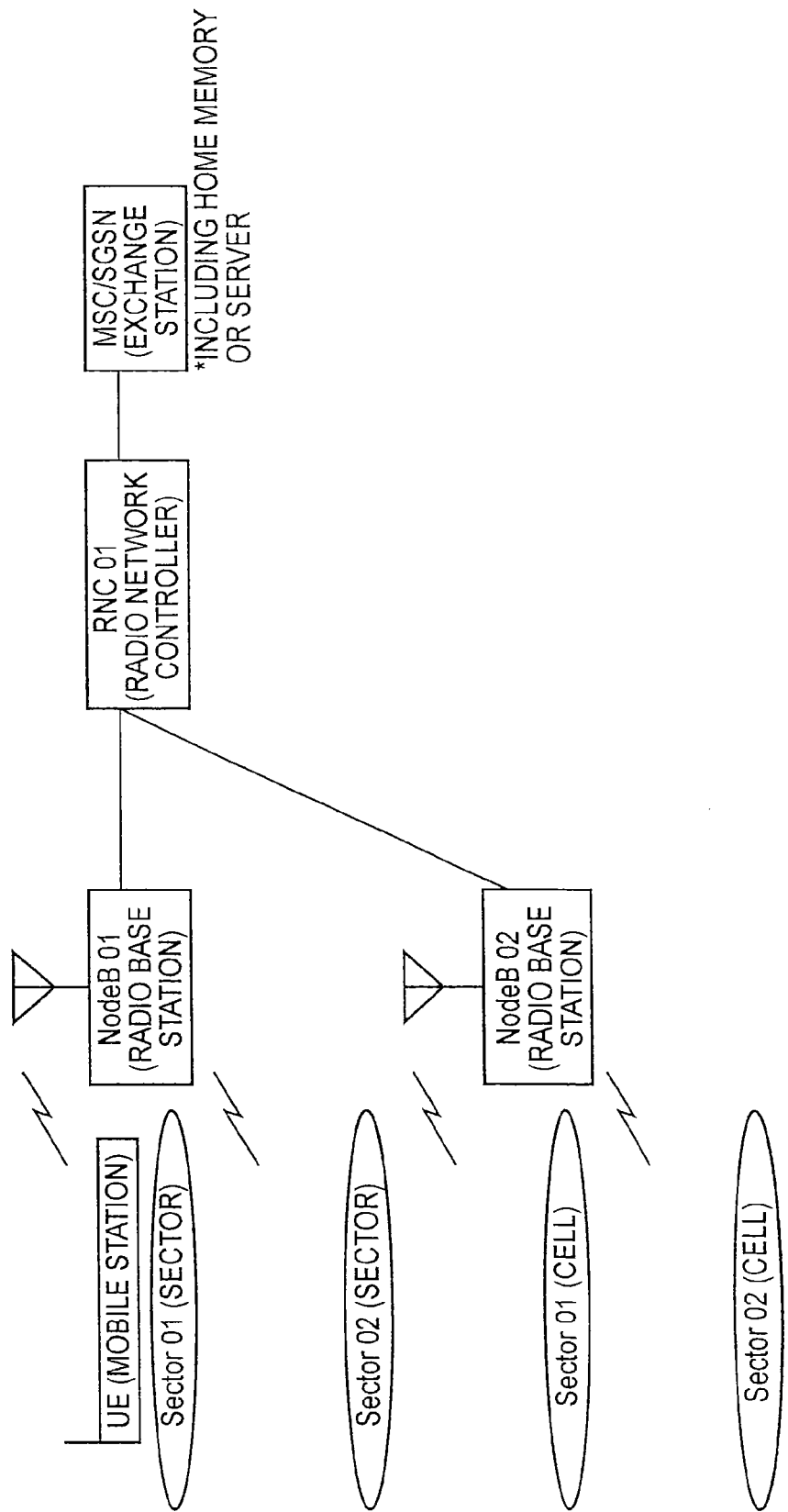
FIG. 8 is an overall configuration diagram of a conventional mobile communication system.
Figure 9:
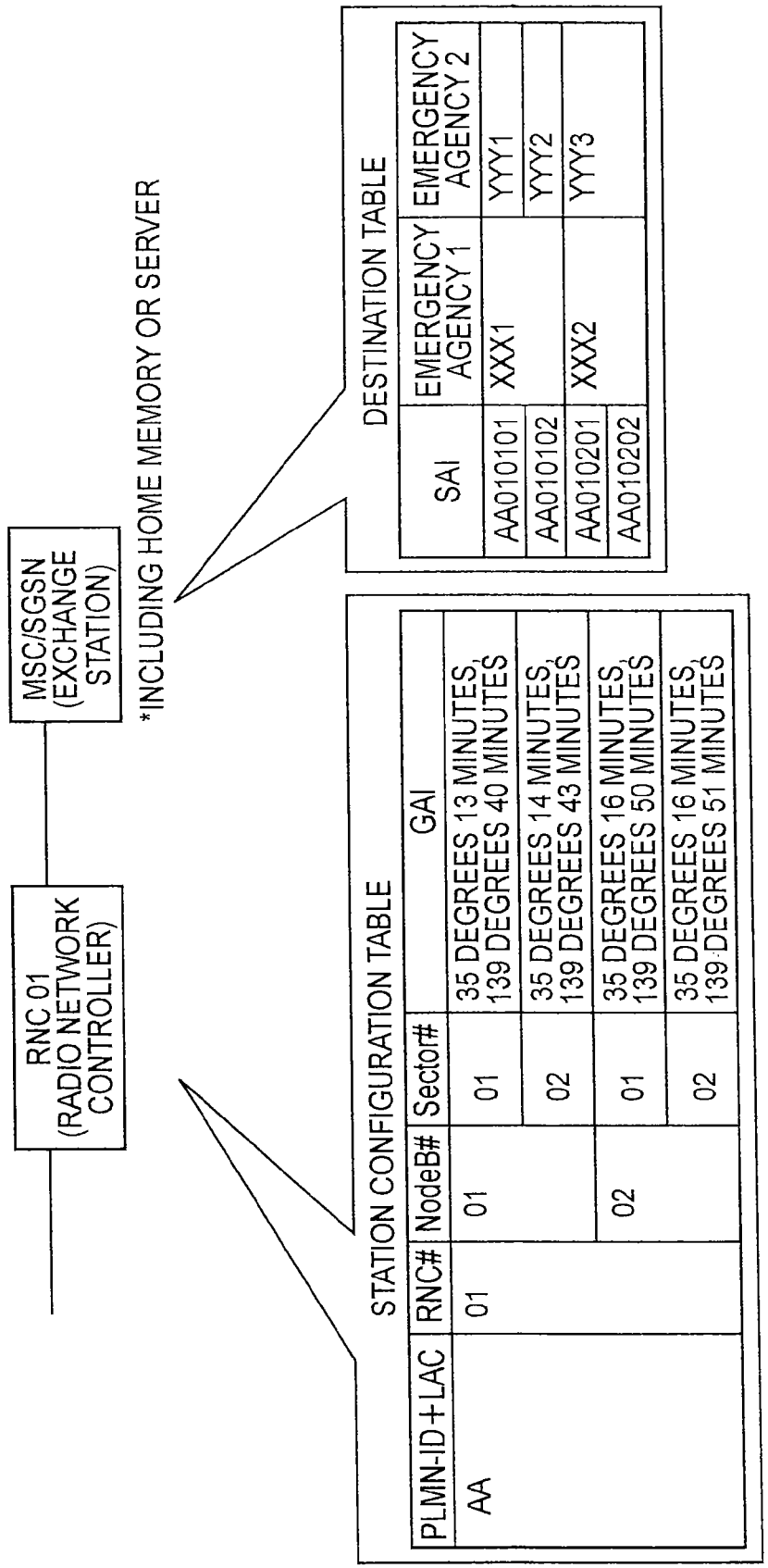
FIG. 9 is a view showing an example of contents stored in memories in a radio base station, a radio network controller, and an exchange station in the conventional mobile communication system.
Figure 10:
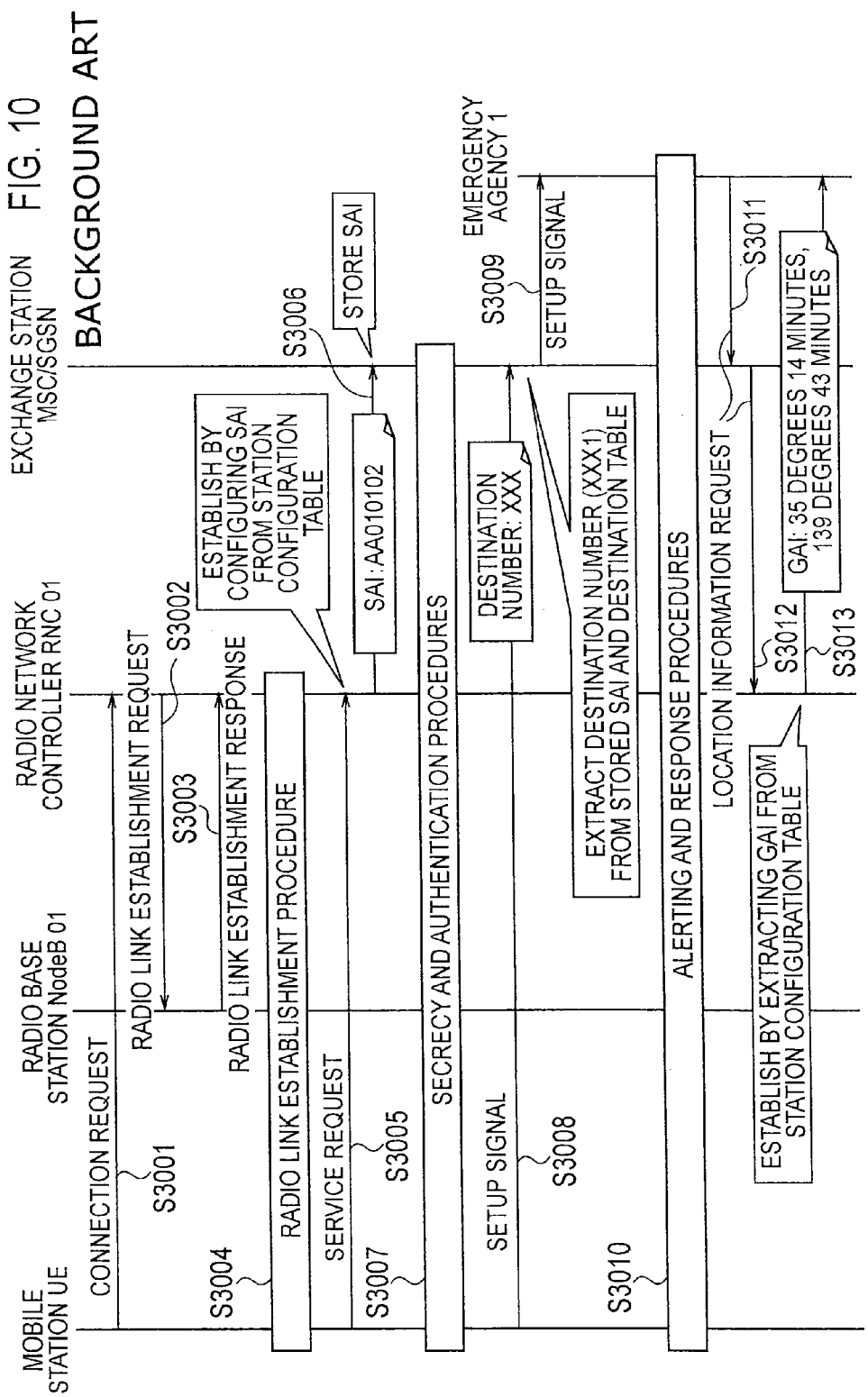
FIG. 10 is a sequence diagram showing operations of the conventional mobile communication system.

As shown in FIG. 1, a mobile communication system according to the embodiment is equivalent to the configuration of the mobile communication system shown in FIG. 8 with addition of a distribution server 1 connected to radio base stations NodeB01 and NodeB02.

Here, as similar to the example shown in FIG. 8, it is usual that multiple exchange stations MSCs/SGSNs are provided and connected to one another. However, only one exchange station MSC/SGSN is shown in the specification for the purpose of simplification.

Moreover, it is usual to provide a device called a home memory configured to store subscriber information, a server for offering application services, and the like in addition to the exchange station. However, description thereof will be omitted in the specification similarly for the purpose of simplification and the function of the home memory and the function of the server are assumed to be included in the exchange station MSC/SGSN.

Figure 3:
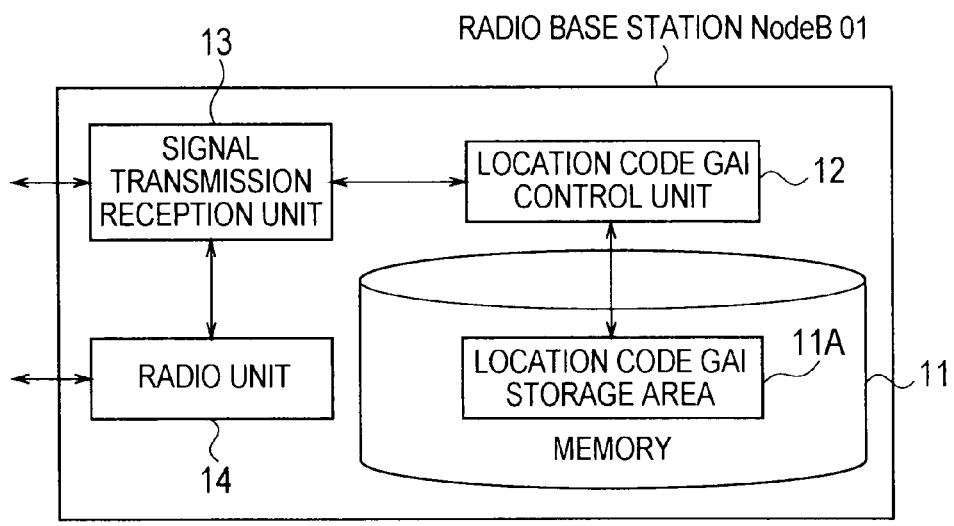
FIG. 3 is a functional block diagram of the radio base station according to the first embodiment of the present invention.

As shown in FIG. 3, the radio base station NodeB01 includes a memory 11, a location code GAI control unit 12, a signal transmission reception unit 13, and a radio unit 14.

The signal transmission reception unit 13 is configured to perform transmission and reception of signals with a radio network controller RNC01 and the distribution server 1.

For example, the signal transmission reception unit 13 is configured to acquire location information (such as a location code or a "GAI") of the radio base station NodeB01 from the distribution server 1.

Here, the signal transmission reception unit 13 is configured to acquire the location information (such as the location code or the "GAI") of the radio base station NodeB01 at a predetermined trigger such as a case of detecting connection to a broadband network.

Here, the signal transmission reception unit 13 may also be configured to acquire the location information (such as the location code or the "GAI") of the radio base station NodeB01 by transmitting a distribution request to the distribution server 1.

Meanwhile, the location information (such as the location code or the "GAI") of the radio base station NodeB01 may be acquired from the distribution server 1 as described above, from a memory or a disk in the radio base station NodeB01, from an external memory, and the like.

Moreover, the signal transmission reception unit 13 is configured to notify the radio network controller RNC01 of the location information (the location code) of the radio base station NodeB01 by means of a radio link establishment response, for example, in starting communication with a mobile station UE via the radio base station NodeB.

The radio unit 14 is configured to exchange station radio signals with the mobile station UE.

Figure 2:
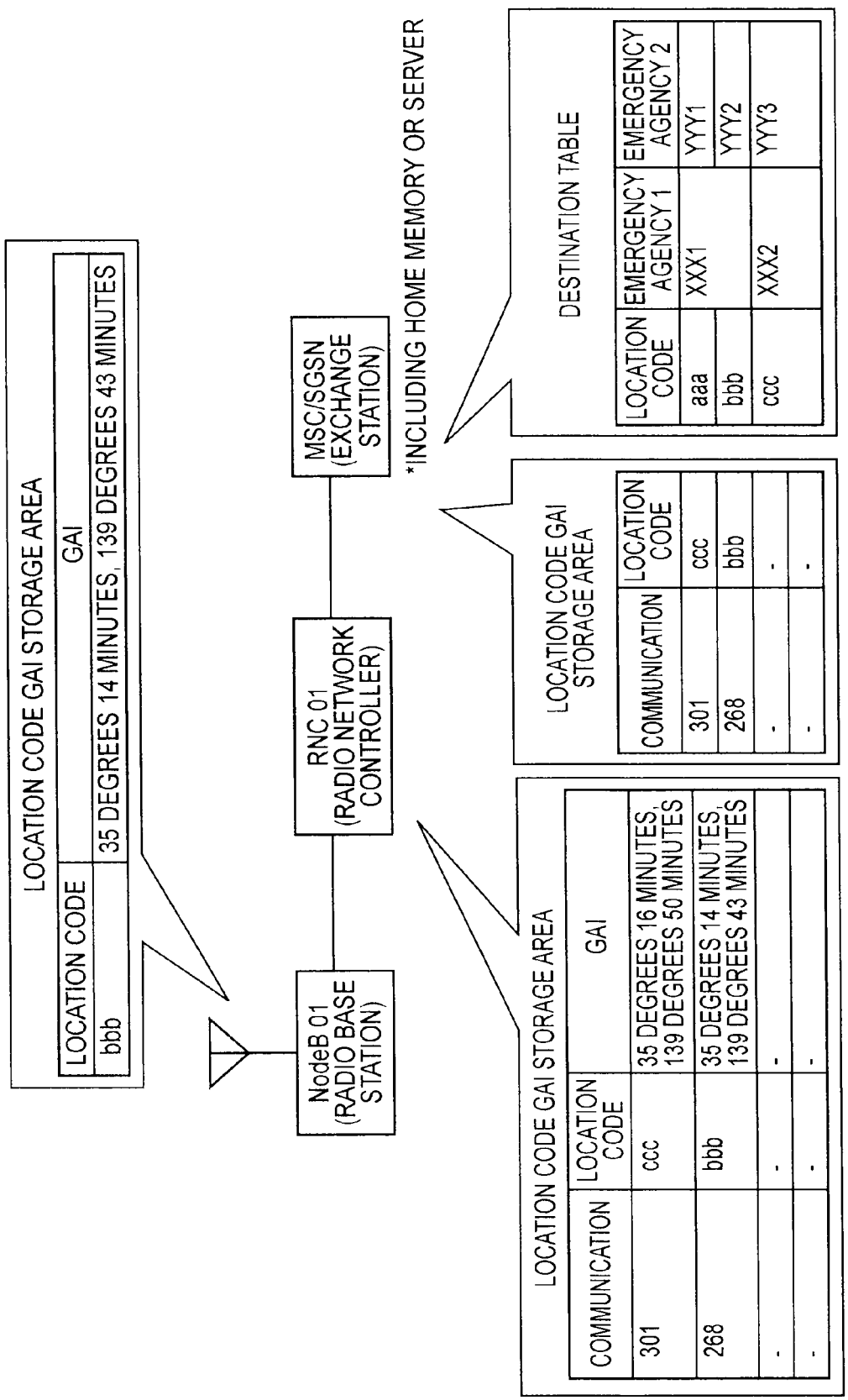
FIG. 2 is a view showing an example of contents stored in memories in a radio base station, a radio network controller, and an exchange station in the mobile communication system according to the first embodiment of the present invention.

A location code GAT storage area 11A is secured in the memory 11. As shown in FIG. 2 and FIG. 3, the location information (the location code) and the "GAT" of the radio base station NodeB01 are stored in association with each other in the location code GAI storage area 11A.

Here, the location code is identification information which is unique nationwide and independent of the configuration of the mobile communication system including a configuration of a location registration area (LAC), a connection configuration of the radio network controller RNC, a connection configuration of the radio base station NodeB, and a configuration of a sector.

Note that stored contents in the location code GAI storage area 11A are configured to be deleted upon termination of each session of the communication and to be updated when the mobile station UE moves between cells in the course of performing each session of the communication.

The location code GAI control unit 12 is configured to write information into the location code GAI storage area 11A and to read the information from the location code GAI storage area 11A in cooperation with the signal transmission reception unit 13.

Figure 4:
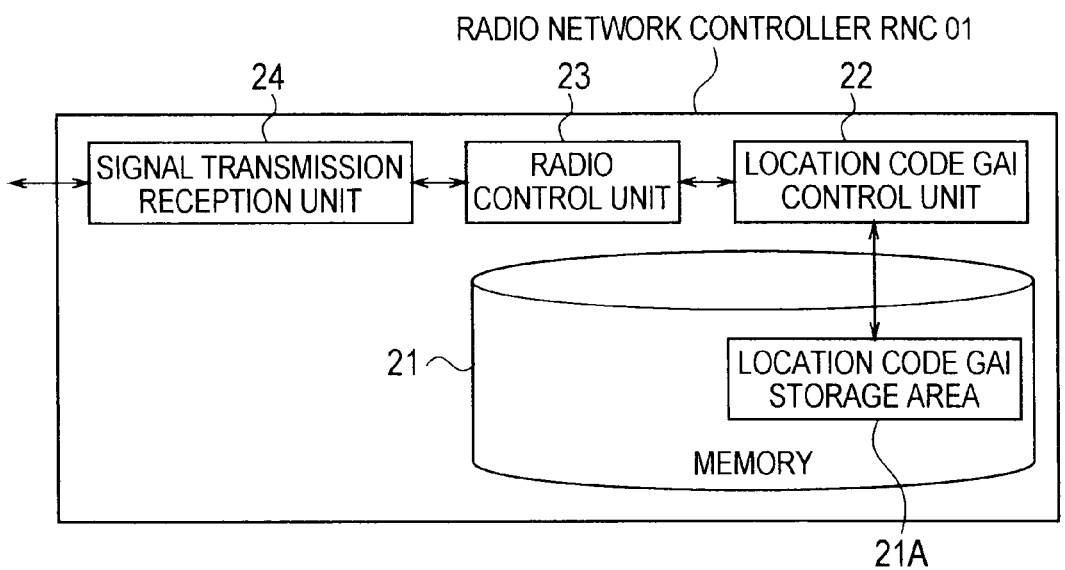
FIG. 4 is a functional block diagram of the radio network controller according to the first embodiment of the present invention.

As shown in FIG. 4, the radio network controller RNC01 includes a memory 21, a location code GAI control unit 22, a radio control unit 23, and a signal transmission reception unit 24.

The signal transmission reception unit 24 is configured to perform transmission and reception of signals with the radio base station NodeB01 and the exchange station MSC/SGSN.

For example, the signal transmission reception unit 24 is configured to acquire the location information (the location code) of the radio base station NodeB01 from the radio base station NodeB01 in starting the communication with the mobile station UE via the radio base station NodeB01.

Moreover, the signal transmission reception unit 24 is configured to notify the exchange station MSC/SGSN of the location information (the location code) of the radio base station NodeB01 by means of a service request, for example, in starting the communication with the mobile station UE via the radio base station NodeB01 and the radio network controller RNC01.

The radio control unit 23 is configured to transmit and receive RRC messages to and from the mobile station UE.

A location code GAI storage area 21A is secured in the memory 21. As shown in FIG. 2 and FIG. 4, the "location code (the location information of the radio base station NodeB01)" and the "GAI" are stored in association with each other in the location code GAI storage area 21A for each session of the communication with the mobile station UE via the radio base station NodeB01 and the radio network controller RNC01.

Note that stored contents in the location code GAI storage area 21A are configured to be deleted upon termination of each session of the communication and to be updated when the mobile station UE moves between the cells in the course of performing each session of the communication.

The location code GAI control unit 22 is configured to write information into the location code GAI storage area 21A and to read the information from the location code GAI storage area 21A in cooperation with the signal transmission reception unit 24.

Figure 5:
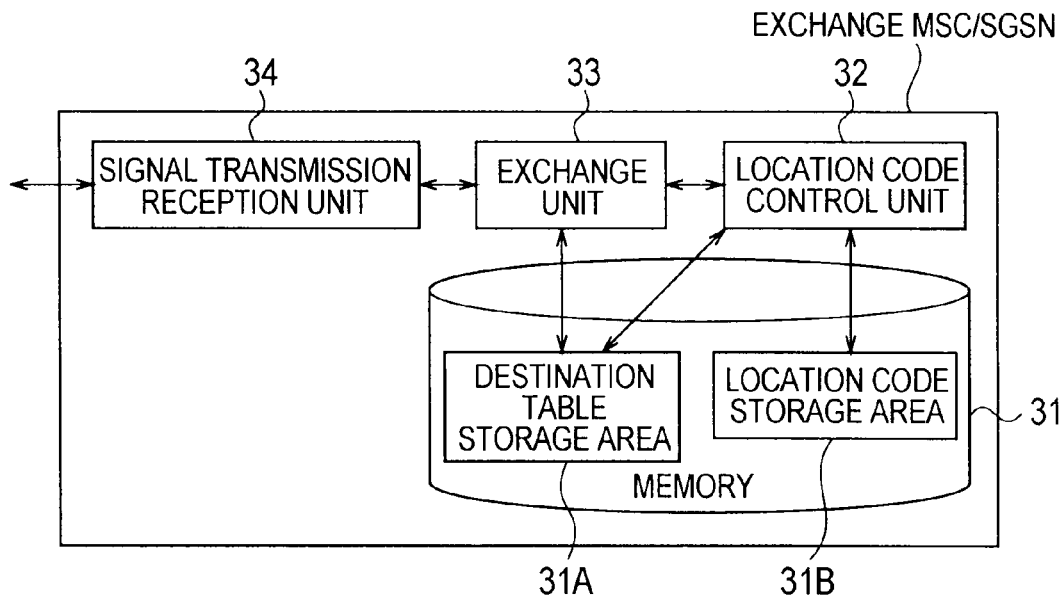
FIG. 5 is a functional block diagram of the exchange station according to the first embodiment of the present invention.

As shown in FIG. 5, the exchange station MSC/SGSN includes a memory 31, a location code control unit 32, an exchange station unit 33, and a signal transmission reception unit 34.

A destination table storage area 31A and a location code storage area 31B are secured in the memory 31.

As shown in FIG. 2 and FIG. 5, a destination table in which the "location code (the location information)" is associated with "emergency agencies (destinations)" is stored in the destination table storage area 31A.

Here, key information for searching the destination table employs the "location code" instead of the "SAI" as in the conventional art.

Meanwhile, as shown in FIG. 2 and FIG. 5, the "location code (the location information of the radio base station NodeB01)" is associated with each session of the communication with the mobile station UE via the radio base station NodeB01, the radio network controller RNC01 and the exchange station MSC/SGSN is stored in the location code storage area 31B.

Note that stored contents in the destination table storage area 31A and the location code storage area 31B are configured to be deleted upon release of each session of the communication and to be updated when the mobile station UE moves between the cells in the course of performing each session of the communication.

The signal transmission reception unit 34 is configured to perform transmission and reception of signals with the radio base station NodeB01 and the radio network controller RNC01.

For example, the signal transmission reception unit 34 is configured to acquire the location information (the location code) of the radio base station NodeB01 from the radio network controller RNC01 in starting the communication with the mobile station UE via the radio base station NodeB01, the radio network controller RNC01 and the exchange station MSC/SGSN.

The exchange unit 33 is configured to connect the mobile station UE to a predetermined destination device when the mobile station UE performs the communication via the radio base station NodeB01, the radio network controller RNC01 and the exchange station MSC/SGSN.

For example, the exchange unit 33 is configured to connect the mobile station UE to a destination (such as an emergency agency) associated with the location information (a location code: bbb) of the radio base station NodeB01 in the course of the communication.

The location code control unit 32 is configured to write information into the destination table storage area 31A and the location code storage area 31B and to read the information from the destination table storage area 31A and the location code storage area 31B in cooperation with the signal transmission reception unit 34.

(Operations of Mobile Communication System according to First Embodiment of Present Invention)

Operations of the mobile communication system according to the first embodiment of the present invention will be described with reference to FIG. 6 and FIG. 7.

First, with reference to FIG. 6, description will be given of operations of the radio base station NodeB01 to acquire the location information (the location code and the "GAI") of the radio base station NodeB01 in the mobile communication system according to the embodiment.

Figure 6:
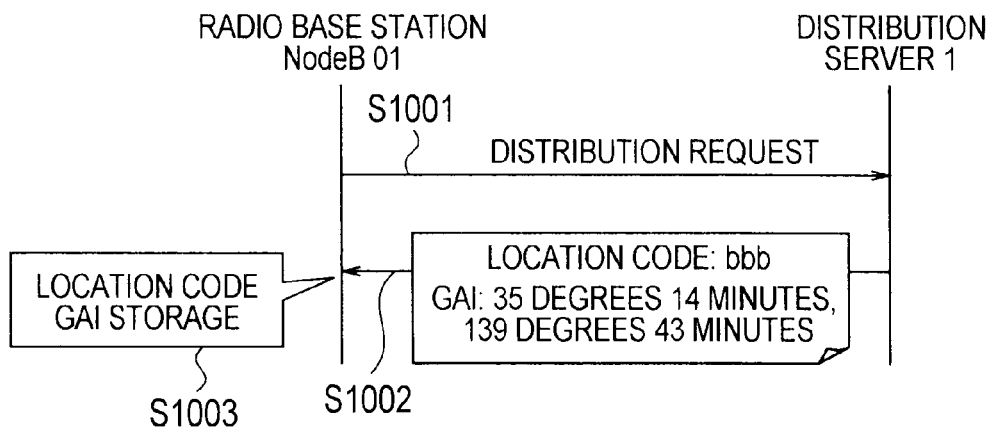
FIG. 6 is a sequence diagram showing operations of the mobile communication system according to the first embodiment of the present invention.

As shown in FIG. 6, in step S1001, the radio base station NodeB01 transmits a distribution request to the distribution server 1 when detecting connection to a broadband network or the like.

In step S1002, the distribution server 1 distributes the location information (such as the location code or the "GAI") of the radio base station NodeB01 to the radio base station NodeB01 in response to the distribution request.

Second, with reference to FIG. 7, description will be given of operations of the radio base station NodeB01 to start emergency notification communication with the emergency agency 1 in the mobile communication system according to the embodiment.

Figure 7:
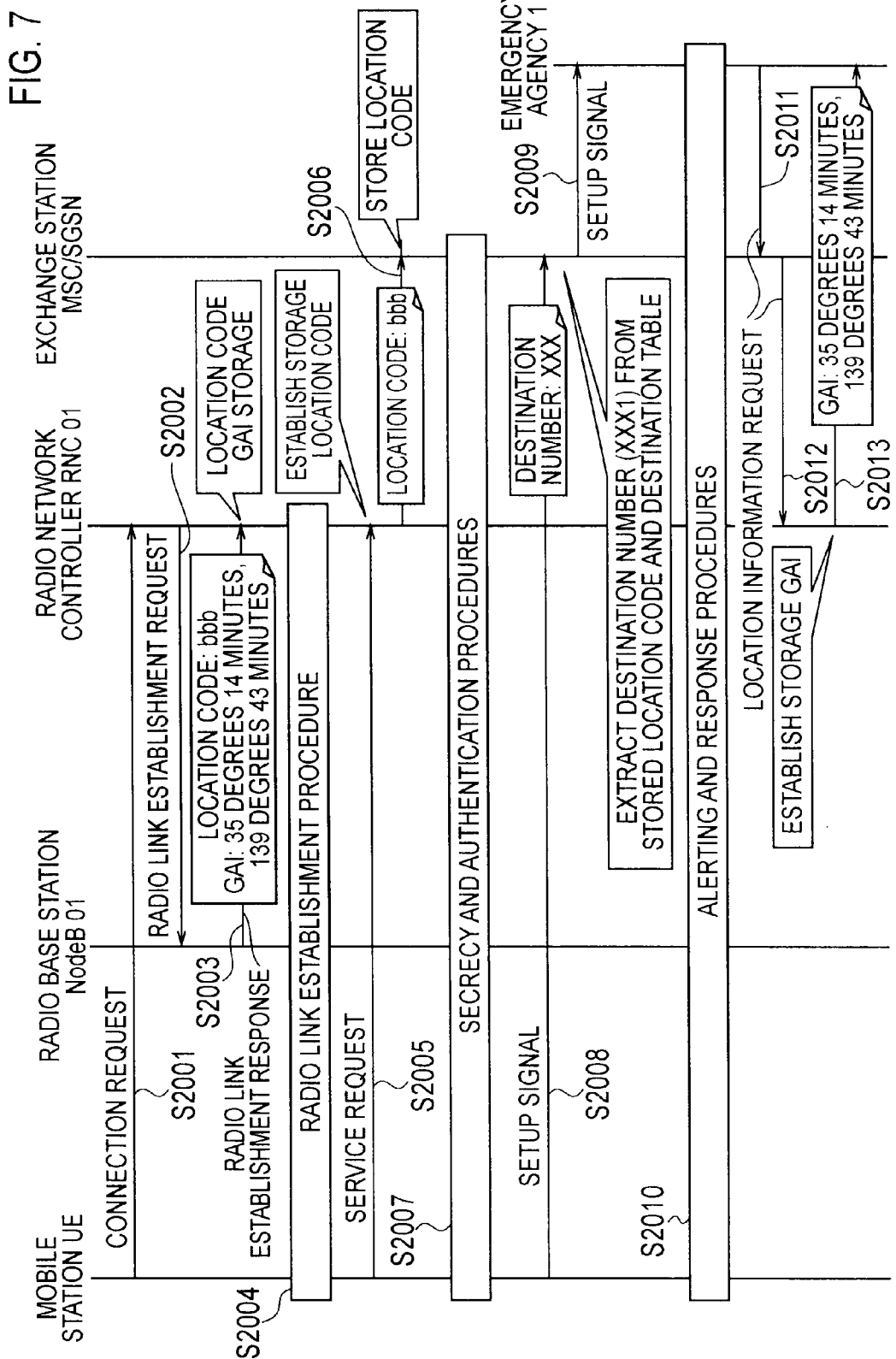
FIG. 7 is a sequence diagram showing operations of the mobile communication system according to the first embodiment of the present invention.

As shown in FIG. 7, in step S2001, the mobile station UE transmits a connection request for performing the emergency notification communication addressed to the emergency agency 1 to the radio network controller RNC01.

In step S2002, the radio network controller RNC01 transmits a radio link establishment request to the radio base station NodeB01.

In step S2003, the radio base station NodeB01 transmits a radio link establishment response to the radio network controller RNC01.

Here, the radio base station NodeB01 notifies the radio network controller RNC01 of the "location code (i.e., the location code of the radio base station NodeB01)" and the "GAI (i.e., the GAI of the radio base station NodeB01)" for the emergency notification communication by means of the radio link establishment response. The radio network controller RNC01 stores the "location code" and the "GAI" in association with the emergency notification communication addressed to the emergency agency 1.

Thereafter, in step S2004, a radio link establishment procedure takes place between the mobile station UE and the radio network controller RNC01.

In step S2005, the mobile station UE transmits a service request for carrying out the emergency notification communication addressed to the emergency agency 1 to the radio network controller RNC01 via the radio network established in step S2004.

In step S2006, the radio network controller RNC01 extracts the "location code" associated with the emergency notification communication addressed to the emergency agency 1 while making reference to the location code GAI storage area 21A, and transmits a service request including the "location code" to the exchange station MSC/SGSN.

Here, the exchange station MSC/SGSN stores the emergency notification communication addressed to the emergency agency 1, and the "location code" in the location code storage area 31B in association with each other.

After Secrecy-authentication procedures between the mobile station UE and the exchange station MSC/SGSN in step S2007, the mobile station UE transmits a setup signal for carrying out the emergency notification communication addressed to the emergency agency 1, namely, a setup signal including "XXX" that means to carry out the emergency notification communication addressed to the emergency agency 1 to the exchange station MSC/SGSN in step S2008.

In step S2009, when the exchange station MSC/SGSN recognizes the "XXX" included in the received setup signal, the exchange station MSC/SGSN extracts "location code" associated with the emergency notification communication addressed to the emergency agency 1 while making reference to the location code storage area 31B, searches the destination table as key information, acquires the address information "XXX1" of the emergency agency 1, and transfers the setup signal to the address information "XXX1" of the emergency agency 1.

In step S2010, the communication (the emergency notification communication) is started between the mobile station UE and the emergency agency 1 after call-response procedures. Then, in step S2011, the emergency agency 1 transmits a location information request including the above-described "location code" or "communication ID (identification information for specifying the emergency notification communication addressed to the emergency agency 1)" to the radio network controller RNC via the exchange station MSC/SGSN. In step S2012, the radio network controller RNC returns the "GAI", which is extracted by using the "location code" or "communication ID" as key information, to the emergency agency 1 via the exchange station MSC/SGSN.

Here, in the above-described embodiment, the radio base station NodeB01 may notify the radio network controller RNC01 of the location code and the "GAI" by using a dedicated signal or may notify the radio network controller RNC01 of the location code and the "GAI" by using a dedicated signal.

Moreover, the above-described embodiment explains the case of the mobile communication system according to the W-CDMA method. However, the present invention is also applicable to a mobile communication system according to an LTE (Long Term Evolution) system. In this case, a radio base station called an "eNB" will support the functions of the radio base station NodeB and the functions of the radio network controller RNC.

Meanwhile, the radio network controller according to the present invention may be a device configured to delete some functions from the functions of the above-described radio network controller RNC and to include a gateway function to connect the femto radio base stations in a concentrated manner.

Further, in the above-described embodiment, it is also possible to adopt a structure called "Anchoring" configured to separate the radio network controller RNC and the radio base station NodeB into a call control (Serving/Anchor) and a visited cell (Drift) by a handover.

In this case, if a call control radio base station NodeB01 (Serving/Anchor) is different from a visited radio base station (Drift) for the mobile station UE, a radio network controller managing the local radio base station (Drift) may notify the radio network controller RNC01 managing the call control radio base station NodeB01 (Serving/Anchor) of the location information (the location code) of the visited radio base station (Drift) as the location information (the location code) of the radio base station NodeB01 (Serving/Anchor) by using a signaling protocol such as "RNSAP (Radio Network Subsystem Application Part)" when the mobile station UE starts the communication via the call control radio base station NodeB01 (Serving/Anchor).

(Advantageous Effect of Mobile Communication System According to First Embodiment of Present Invention)

According to the mobile communication system of the first embodiment of the present invention, the location information of the radio base station NodeB01 is not retained as system data by the radio network controller RNC01 or the exchange station MSC/SGSN, but is acquired and dynamically connected by the radio base station NodeB01 every time the communication is carried out. Hence it is not necessary to update the system data in the radio network controller RNC01 or the exchange station MSC/SGSN in newly managing the radio base station NodeB01. Hence numerous radio base stations such as femto base stations can be newly connected at flexible timing.

Moreover, according to the mobile communication system of the first embodiment of the present invention, it is not necessary to notify the location information (the location code) of the radio base station NodeB01 from the radio base station NodeB01 to the radio network controller RNC01 by using a common signal or to cause the radio network controller RNC01 to retain the location information (the location code) of the radio base station NodeB01 as common information. Hence it is possible to avoid loads on a network bandwidth and processing associated with transmission and reception of signals as well as memory consumption associated with information retention.

Moreover, according to the mobile communication system of the first embodiment of the present invention, it is possible to newly connect the numerous radio base stations such as the femto base stations at flexible timing, as described above, even when the visited radio network controller is different from the call control radio network controller.

Moreover, according to the mobile communication system of the first embodiment of the present invention, it is possible to avoid operation complexity associated with a change in the location registration area, a new installation or connection change of the radio network controller NodeB or the radio base station RNC by utilizing the location code independent of the configuration of the mobile communication system as the location information of the radio base station NodeB01.

Furthermore, according to the mobile communication system of the first embodiment of the present invention, it is possible to avoid a serious accident such as disconnection of emergency notification communication due to an operation mistake.

The above-described features of the embodiment may also be expressed as below.

The feature of a first aspect of the embodiment is a mobile communication method comprising: step A of notifying, by a radio base station NodeB01, a radio network controller RNC01 of location information (location code: bbb) of the radio base station NodeB01; step B of notifying, by the radio network controller RNC01, an exchange station MSC/SGSN of the location information (location code: bbb) of the radio base station NodeB01 when a mobile station UE starts communication via the radio base station NodeB01 and the radio network controller RNC01; and step C of controlling each session of the communication by the exchange station MSC/SGSN based on the location information (location code: bbb) of the radio base station NodeB01.

In the first aspect of the embodiment, in the step A, the radio base station NodeN01 may notify the radio network controller RNC01 of the location information (location code: bbb) of the radio base station NodeB01 when the mobile station UE starts communication via the radio base station NodeB01.

In the first aspect of the embodiment, if the radio base station NodeB01 is different from a visited radio base station for the mobile station UE, a radio network controller managing the visited radio base station may notify the radio network controller RNC01 managing the radio base station NodeB01 of location information (location code) of the visited radio base station as the location information (location code) of the radio base station NodeB01 in step A when the mobile station UE starts the communication via the radio base station NodeB01.

In the first aspect of the embodiment, the location information may be information which is independent of a configuration of a mobile communication system including a location registration area configuration, a radio network controller RNC connection configuration, a radio base station NodeB connection configuration, and a sector configuration.

In the first aspect of the embodiment, the exchange station MSC/SGSN may store the location information (location code) and a destination (emergency agency, for example) in association with each other, and in the step C the exchange station MSC/SGSN may connect the mobile station UE to the destination associated with the location information (location code: bbb) of the radio base station in the communication.

The feature of a second aspect of the embodiment is a radio base station NodeB01 comprising: a signal transmission reception unit 13 configured to acquire location information (location code: bbb) of the radio base station NodeB01, and configured to notify a radio network controller RNC01 of the location information (location code: bbb) of the radio base station NodeB01 when a mobile station UE starts communication via the radio base station NodeB01.

In the second aspect of the embodiment, the location information may be information independent of a configuration of a mobile communication system including a location registration area configuration, a radio network controller RNC connection configuration, a radio base station NodeB connection configuration, and a sector configuration.

The feature of a third aspect of the embodiment is a radio network controller RNC01 configured to connect a radio base station NodeB01, comprising: a signal transmission reception unit 24 configured to acquire location information (location code: bbb) of the radio base station NodeB01 from the radio base station NodeB01 when a mobile station UE starts communication via the radio base station NodeB01, and configured to notify an exchange station MSC/SGSN of the location information (location code: bbb) of the radio base station NodeB01 when the mobile station UE starts communication via the radio base station NodeB01 and the radio network controller RNC01.

In the third aspect of the embodiment, the location information may be information independent of a configuration of a mobile communication system including a location registration area configuration, a radio network controller RNC connection configuration, a radio base station NodeB connection configuration, and a sector configuration.

The feature of a fourth aspect of the embodiment is an exchange station MSC/SGSN connected to a radio network controller RNC01 configured to connect a radio base station NodeB01, comprising: a memory 31 configured to store location information (location code) and a destination in association with each other; a signal transmission reception unit 34 configured to acquire location information (location code: bbb) of the radio base station NodeB01 from the radio network controller RNC01 when a mobile station UE starts communication via the radio base station NodeB01, the radio network controller RNC01 and the exchange station MSC/SGSN; and an exchange unit 33 configured to cause the mobile station UE to be connected to the destination (emergency agency, for example) associated with the location information (location code: bbb) of the radio base station NodeB01 in the communication.

In the fourth aspect of the embodiment, the location information may be information independent of a configuration of a mobile communication system including a location registration area configuration, a radio network controller RNC connection configuration, a radio base station NodeB connection configuration, and a sector configuration.

Note that operation of the above described radio base stations NodeB, the radio network controller RNC, the exchange station MSC/SGSN and the mobile station UE may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, radio base station eNB and radio network controller RNC. Also, the storage medium and the processor may be provided in the radio base stations NodeB, the radio network controller RNC, the exchange station MSC/SGSN and the mobile station UE as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of notifying, by a radio base station, a radio network controller of location information of the radio base station;
   step B of notifying, by the radio network controller, an exchange station of the location information of the radio base station when a mobile station starts communication via the radio base station and the radio network controller; and
   step C of controlling each session of the communication by the exchange station based on the location information of the radio base station, wherein the location information is information independent from a configuration of a mobile system including a location registration area configuration, a radio network controller connection configuration, a radio base station connection configuration, and a sector configuration,
   the mobile station is configured to store the location information of the radio base station in association with a Geographical Area Identifier (GAI), the GAI being absolute geographic information independent from the configuration of the mobile communication system and including latitude and longitude information,
   the radio network controller is configured to store the location information in association with the GAI for each communication of the mobile station which is performed through the radio base station and the radio network controller,
   the exchange station is configured to store the location information in association with a communication destination, and store the location information associated with each communication of the mobile station that is performed through the radio base station, the radio network controller and the exchange station, and
   in the step C, the exchange station connects with the mobile station with the communication destination associated with the location information of the radio base station in the communication.

2. The mobile communication method according to claim 1, wherein
   in the step A, the radio base station notifies the radio network controller of the location information of the radio base station when the mobile station starts communication via the radio base station.

3. A mobile communication method comprising:
   step A of notifying, by a radio base station, a radio network controller of location information of the radio base station;
   step B of notifying, by the radio network controller, an exchange station of the location information of the radio base station when a mobile station starts communication via the radio base station and the radio network controller; and
   step C of controlling each session of the communication by the exchange station based on the location information of the radio base station, wherein
   in the step A, the radio base station notifies the radio network controller of the location information of the radio base station when the mobile station starts communication via the radio base station, and
   if the radio base station is different from a visited radio base station for the mobile station, a radio network controller managing the visited radio base station notifies the radio network controller managing the radio base station of location information of the visited radio base station as the location information of the radio base station in step A when the mobile station starts the communication via the radio base station.

4. A radio base station comprising:
   circuitry configured to
      acquire location information of the radio base station; and
      notify a radio network controller of the location information of the radio base station when a mobile station starts communication via the radio base station, wherein
   the location information is independent from a configuration of a mobile communication system including a location registration area configuration, a radio network controller connection configuration, a radio base station connection configuration, and a sector configuration.

5. A radio network controller configured to connect a radio base station, comprising:
   circuitry configured to
      acquire location information of the radio base station from the radio base station when a mobile station starts communication via the radio base station;
      notify an exchange of the location information of the radio base station when the mobile station starts communication via the radio base station and the radio network controller; and
      store the location information and in association with a Geographical Area Identifier (GAI) for each communication of the mobile station performed through the radio base station and the radio network controller, the GAI being absolute geographic information independent from the configuration of the mobile communication system and including latitude and longitude information, wherein the location information is independent from a configuration of a mobile communication system including a location registration area configuration, a radio network controller connection configuration, a radio base station connection configuration, and a sector configuration.

6. An exchange station connected to a radio network controller configured to connect a radio base station, comprising:

circuitry configured to store location information and a destination in association with each other;

acquire location information of the radio base station from the radio network controller when a mobile station starts communication via the radio base station, the radio network controller and the exchange station;

connect the mobile station to the destination associated with the location information of the radio base station in the communication;

store, in a first storage area, a communication destination table which associates the location information and a communication destination;

store, in a second storage area, the location information associated with each communication of the mobile station that is performed through the radio base station, the radio network controller and the exchange station, wherein the location information is independent from a configuration of a mobile communication system including a location registration area configuration, a radio network controller connection configuration, a radio base station connection configuration, and a sector configuration, and the circuitry is configured to connect the mobile station with the communication destination associated with the location information of the radio base station in the communication.

7. The exchange station according to claim 6, wherein the contents stored in the first and second storage areas are deleted when the communication is terminated, and are updated when the mobile station transitions between cells during the communication.

* * * * *